J. C. Hintz,
Scroll Sawing Machine.
N° 18,745.  Patented Dec. 1, 1857.

UNITED STATES PATENT OFFICE.

JOHN C. HINTZ, OF CINCINNATI, OHIO.

MACHINE FOR SAWING BEVELED CURVES.

Specification of Letters Patent No. 18,745, dated December 1, 1857.

*To all whom it may concern:*

Be it known that I, JOHN C. HINTZ, of Cincinnati, Hamilton county, Ohio, have invented a new and useful Machine for Sawing Curved and Winding Forms; and I hereby declare the following to be a full, clear, and exact description thereof, reference being had to the accompanying drawings, making part of this specification.

My invention has for its object the sawing of curved and winding forms in large pieces of timber such as are required in ship building; and consists in a peculiar system of shifting rests in connection with a scroll saw and a feed roller by means of which the operator is enabled, while the saw is in action to impart any desired deflecting, rolling or winding motion to the stuff.

Figure 3:
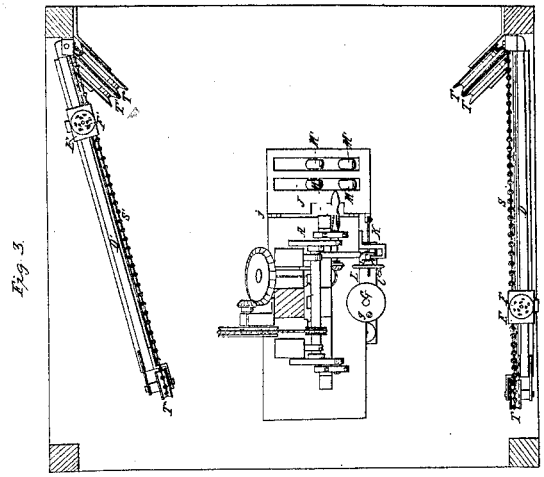
Figure 2:
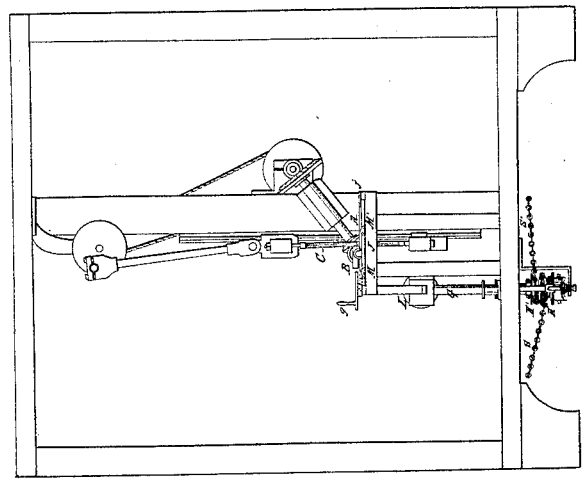
Figure 1:
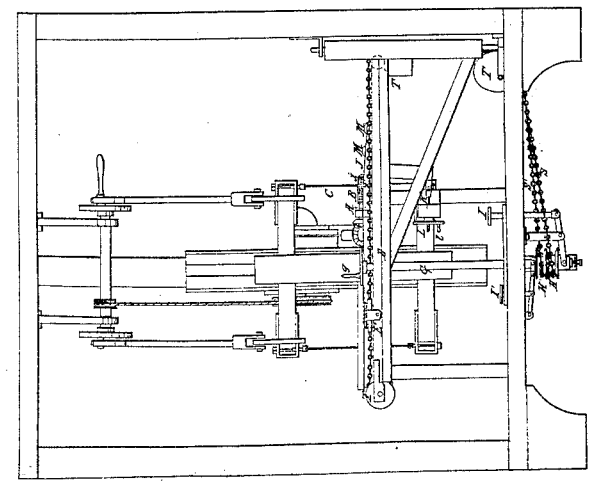

In the accompanying drawings Figure 1 is a front view of the machine. Fig. 2 is a side view (the cranes being hidden) Fig. 3 is a plan.

A, is a bench, mounted with a feed roller B and traversed by a large " scroll " or " jig " saw C, actuated by " power " in the usual manner. The feed roller B, has longitudinally, the represented spherical form, to adapt it to forward the log, in whatever canted position it may be placed.

The work is placed completely under the control of the operator, while standing at his post near the saw, by the following means.

D, D', are two cranes, supporting each of them a carriage E, E', each carriage being surmounted with a turning rest F, F', armed at top with points or burrs. On these rests (F, F',) the ends of the log or slab are supported as hereafter explained.

The carriages E, E', are made to traverse the cranes by the following means. A shaft G, is surmounted with a winch $g$, convenient to the hand of the operator, and at its lower end carries two pulleys H, H', one or other of which, as they are elevated or depressed on the shaft by the pedal I or I'—engages with a feather on the shaft G, and is thereby compelled to revolve with the latter. The rotation of the pulley H moves the carriage E, by means of the chain S, which being stretched around pulleys T, has its ends fastened respectively to the front and back of the carriage. The rotation of the pulley H' in like manner moves the carriage E', by means of the chain S', stretched around pulleys T'.

The above described rests with their supporting carriages I style collectively " the traversing and turning rests F, F'.

In place of the tackling G $g$ H H' S S' T T', for operating the rests E F, E' F', other familiar forms of transmitting motion may be employed, such for example as a combination of screw and bevel gearing.

The wind or bevel is produced in the timber as follows:

J is a vibrating frame or rest connected to the bench A, by a horizontal hinge $j$, in a line or nearly so with the plane of the saw. The free edge of this rest is subject to elevation and depression by means of a winch $l$ attached to a nut L, which communicates through a screw threaded rod K with an arm depending from the rest J. Journaled in the top of the rest J, at right angles to its hinge, are friction rollers M M.

The operation is as follows: A log or slab, marked with the desired lines of kerf is placed in position, with its rear end on the rest E F, and its front end on the feed roller B and the friction rollers M of the rest J, which is then so adjusted as to bring the commencement of the kerf lines exactly opposite the cutting edge of the saw. Then, the pedal I, being depressed, the bearing or direction of the log is so adjusted by the winch $g$, as to bring the kerf lines tangential with the blade of the saw. The machine being then set in motion the rotation of the feed roller B, forwards the stuff to the action of the saw while the sawyer, having the winches $g$, and $l$, at his command, so deflects and rolls the log so as to obtain the desired cut. As the log advances, the crane D, turning easily on its centers, accommodates itself to the motion. When the log, by its progressive motion, approaches equilibrium on the feed roller, a slight weight or pressure is applied, to hold down its rear end, until the center of gravity has passed the roller. The motion of the saw and feed roller are then suspended and the pedal I' being depressed the forward rest E' F'—thus connected with the winch $g$,— is brought under the front end of the log, which is allowed to rest upon it, the motions of the saw and feed roller being then resumed, the log is governed through its connection with the forward rest, the winch $g$, being employed as before.

Throughout the operation any desired bevel (varied at pleasure) is imparted to the log by means of the rest J which supporting as it does the chief weight of the log is enabled to control the bevel sufficiently for general purposes but if it be preferred the rolling of the log may be facilitated by constructing the rests E F E' F' so as to admit of a limited rocking motion.

A customary clutch operated by a lever may be substituted for the described pedal movement; or the rests may be worked by means of independent winch shafts.

The swing of the cranes may be placed under the control of the sawyer by means of endless cords or otherwise.

I claim as new and of my invention herein—

1. The cranes D, D', with the traversing and turning rests E F, E', F', communicating by means substantially as described with a winch $g$ or its equivalent, convenient to the hand of the sawyer; in the described combination with a scroll saw and feed roller for the purposes set forth.

2. I claim in this connection, the rest J $j$, constructed and operated substantially as and for the purposes set forth.

In testimony of which invention I hereunto set my hand.

JOHN C. HINTZ.

Attest:
GEO. H. KNIGHT,
JAS. H. GRIDLEY.